United States Patent
Addleman et al.

(10) Patent No.: US 8,360,706 B2
(45) Date of Patent: Jan. 29, 2013

(54) SIDE RECOVERY SYSTEM FOR A VEHICLE

(75) Inventors: Jeffrey L. Addleman, Chambersburg, PA (US); Jonathan Ashley, Greencastle, PA (US); Sanjeev Kuriakose, Shippensburg, PA (US); Jeffrey L. Weller, Greencastle, PA (US)

(73) Assignee: Jerr-Dan Corporation, Greencastle, PA (US)

( * ) Notice: Subject to any disclaimer, the term of this patent is extended or adjusted under 35 U.S.C. 154(b) by 1031 days.

(21) Appl. No.: 12/271,774

(22) Filed: Nov. 14, 2008
(Under 37 CFR 1.47)

(65) Prior Publication Data
US 2009/0285662 A1    Nov. 19, 2009

Related U.S. Application Data

(63) Continuation-in-part of application No. 12/256,157, filed on Oct. 22, 2008.

(60) Provisional application No. 60/988,672, filed on Nov. 16, 2007, provisional application No. 60/982,023, filed on Oct. 23, 2007.

(51) Int. Cl.
*B60P 1/04* (2006.01)
(52) U.S. Cl. ........................... 414/470; 414/471
(58) Field of Classification Search ................. 414/470, 414/471
See application file for complete search history.

(56) References Cited

U.S. PATENT DOCUMENTS

| | | |
|---|---|---|
| 3,783,267 A | 1/1974 | Thomas |
| 8,192,135 B2 | 6/2012 | Ceccarelli et al. |
| 2004/0221673 A1 | 11/2004 | Mojzis |
| 2004/0228714 A1* | 11/2004 | Ceccarelli et al. ............ 414/563 |
| 2008/0038106 A1* | 2/2008 | Spain ............................ 414/563 |

OTHER PUBLICATIONS

Vehicle having a recovery device understood to be commercially available from American Enterprises of Oregon, OH on Oct. 18, 2007 (14 images, 7 sheets).
Vehicle having a recovery device understood to be commercially available from Trebron, Inc. of Coralville, IA on Aug. 24, 2007 (2 images, 2 sheets).
Vehicle having a recovery device understood to be commercially available from Trebron, Inc. of Coralville, IA on Aug. 24, 2007 (7 images, 4 sheets).
Promotional materials for a recovery device of a type understood to be commercially available from Idaho Wrecker Sales; printed from website http://sidepuller.com; Oct. 16, 2006; one sheet.
Ceccarelli, Chuck, "Sidepuller at work," American towman; printed from website http://towman.com; Oct. 17, 2006.
Promotional materials for a recovery device of a type understood to be commercially available from Danco Products; printed from website http://dancoproducts.com; Apr. 9, 2007; two sheets.
Office Action for U.S. Appl. No. 12/256,157 dated Sep. 28, 2011, 7 pages.

\* cited by examiner

*Primary Examiner* — Saul Rodriguez
*Assistant Examiner* — Willie Berry, Jr.
(74) *Attorney, Agent, or Firm* — Foley & Lardner LLP

(57) ABSTRACT

A side recovery system is disclosed that includes a base configured to be supported on a vehicle and a boom supported by the base and having a first end and a second end. The boom is rotatable relative to the base about a substantially horizontal axis between a first position and second position. The second end of the boom being positioned at a first side of the vehicle in the first position and at an opposite second side of the vehicle in the second position. The system also includes a first sheave supported at the second end of the boom and configured to receive a load bearing cable. The cable configured to remain received by the first sheave as the boom rotates between the first position and the second position.

20 Claims, 12 Drawing Sheets

SIDE RECOVERY SYSTEM FOR A VEHICLE

CROSS REFERENCE TO RELATED PATENT APPLICATIONS

The present application is a continuation-in-part of U.S. patent application Ser. No. 12/256,157, having a filing date of Oct. 22, 2008, titled "Side Recovery System for a Vehicle," which claims priority to of U.S. Provisional Application No. 60/982,023, having a filing date of Oct. 23, 2007, the complete disclosures of which are hereby incorporated by reference. The present application also claims the benefit under 35 U.S.C. §119(e) of U.S. Provisional Application No. 60/988,672, having a filing date of Nov. 16, 2007, titled "Side Recovery System for a Vehicle," the complete disclosure of which is hereby incorporated by reference.

BACKGROUND

The present disclosure relates to a side recovery system suitable for use with a vehicle. More specifically, the present disclosure relates to a side recovery system suitable for use with a recovery vehicle, such as a wrecker, etc. The present disclosure also relates to a recovery vehicle that incorporates such a side recovery system.

It would be desirable to provide a side recovery system for a vehicle that can be selectively reconfigured or moved between a first side of the vehicle and a second side of the vehicle to allow for recoveries from each side of the vehicle without requiring the vehicle to support a relatively large and/or expensive system that permanently provides for recoveries from each side of the vehicle. Such a system would provide an improved side recovery system that is smaller, light-weight and/or more cost effective to manufacturer and/or maintain. Such a system may also reduce the amount of time needed to setup the system for a recovery opposite the side of vehicle in which the system is currently setup for. However, the problems posed by this type of arrangement are particularly complicated because they exist within the complexity of the overall recovery vehicle. For example, the sizing constraints of the recovery vehicle cab, the positioning of a wrecker arm, storage compartments and/or light pylon, etc. add to the complexities of the recovery vehicle. Accordingly, the selection of a solution may result in unforeseen complications, cost increases, manufacturing efficiency losses, expensive part configurations, performance losses, etc.

SUMMARY

According to an exemplary embodiment, a side recovery system having a longitudinal axis extending in a fore and aft direction of the vehicle includes a base configured to be supported on the vehicle and a boom supported by the base and having a first end and a second end. The boom is rotatable relative to the base about an axis configured to be substantially parallel to the longitudinal axis of the vehicle between a first position and a second position. The second end of the boom is positioned at a first side of the vehicle in the first position and at an opposite second side of the vehicle in the second position. The system also includes a first sheave supported at the second end of the boom and configured to receive a load bearing cable. The system is configured so that cable remains received by the first sheave as the boom rotates between the first position and the second position.

According to another exemplary embodiment, a recovery vehicle includes a chassis having a longitudinal axis extending in a fore and aft direction of the vehicle and a side recovery system. The side recovery system includes a base configured to be supported on the vehicle and a boom supported by the base and having a first end and a second end. The boom is rotatable relative to the base about an axis configured to be substantially parallel to the longitudinal axis of the vehicle between a first position and a second position. The second end of the boom is positioned at a first side of the vehicle in the first position and at an opposite second side of the vehicle in the second position. The system also includes a first sheave supported at the second end of the boom and configured to receive a load bearing cable. The system is configured so that cable remains received by the first sheave as the boom rotates between the first position and the second position.

According to another exemplary embodiment, a recovery vehicle includes a chassis, a side recovery system supported at the chassis and a fleet angle management system. The side recovery system includes a boom that is selectively positionable between a first side of the vehicle and an opposite second side of the vehicle. The fleet angle management system includes a winch having a drum configured to receive a cable and rotatable about a first axis, an output sheave configured to receive the cable from the winch, and a winding device for guiding the cable from the winch to the output sheave. The winding device includes a lead sheave and a support member for supporting the lead sheave. The lead sheave is rotatable about a second axis that is substantially parallel to the first axis. The lead sheave has an input side configured to receive the cable from the winch and an output side configured to direct the cable the output sheave. The support member is rotatable about a third axis that is substantially perpendicular to the first axis and the second axis. A force imposed by the cable on the input side of the lead sheave causes the support member to rotate about the third axis as the cable winds on and off the drum thereby reducing the fleet angle of the cable.

DETAILED DESCRIPTION

Figure 1:
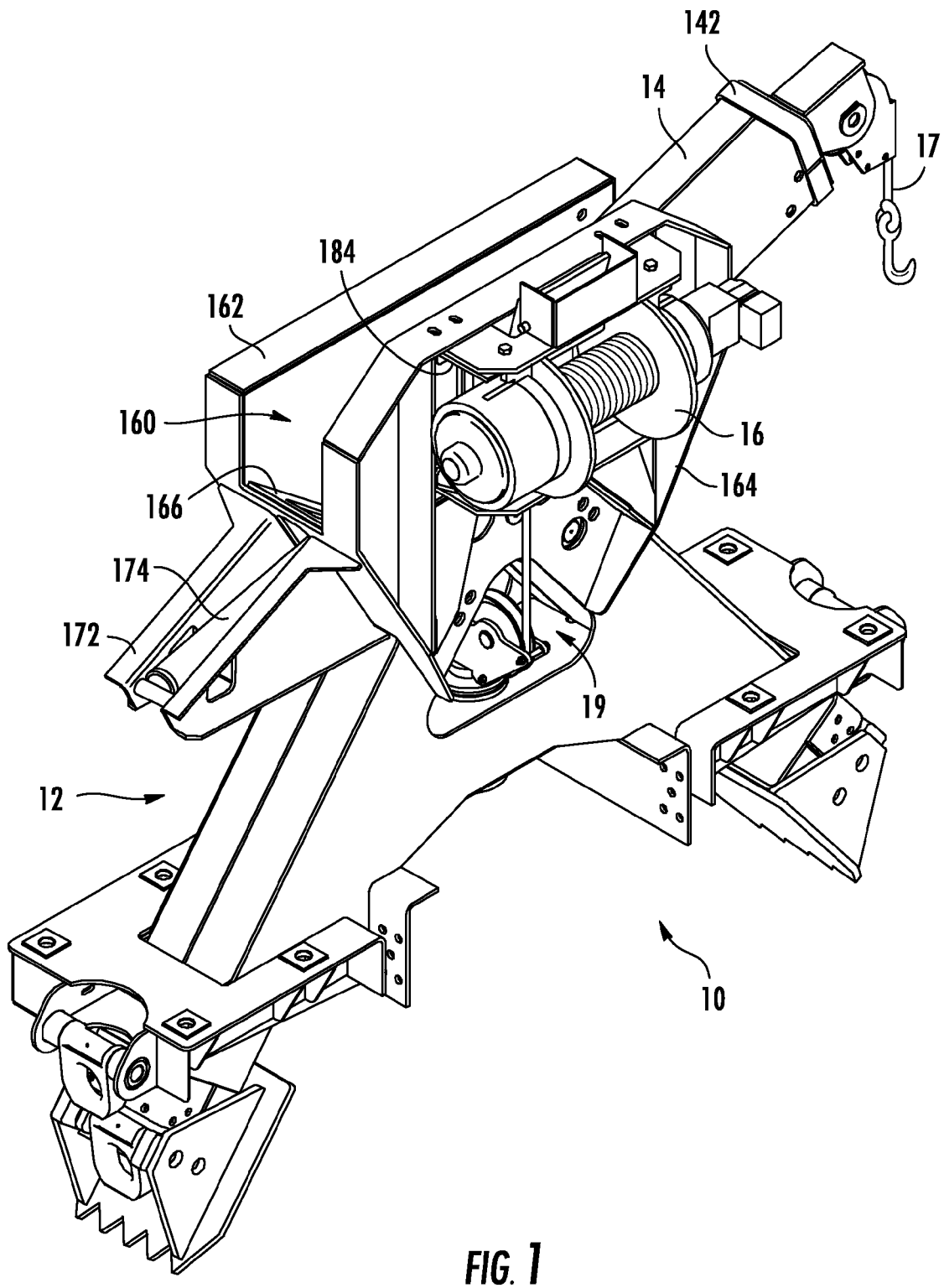
FIG. 1 is an isometric view of a side recovery system according to an exemplary embodiment.

Referring generally to the FIGURES, a side recovery system 10 and components thereof are shown according to exemplary embodiments. Side recovery system 10 is intended to be secured to a recovery vehicle (e.g., carrier, wrecker, tow truck, emergency response vehicle, tractor, crane, etc.) and used for pulling, lifting, hoisting or otherwise manipulating a load (e.g., an obstruction, a container, a disabled vehicle such as an overturned truck, etc.) from a side (e.g., a lateral side, etc.) of the recovery vehicle. Side recovery system 10 is selectively adjustable (e.g., movable, configurable, reconfigurable, etc.) so that side recovery system 10 can be used to manipulate a load from a first side of the recovery vehicle (e.g., a first lateral side, a left side, a driver's side, etc.) and an opposite second side of the recovery vehicle (e.g., a second lateral side, a right side, a passenger side, etc.).

To facilitate the selective adjustability of side recovery system 10, side recovery system 10 generally includes a boom that is movable (e.g., displaceable, rotatable, swingable, etc.) between a first position for manipulating a load from the first side of a recovery vehicle and a second position for manipulating a load from the second side of the recovery vehicle. The boom extends between a first end and a second end. The first end of the boom is configured to be supported near or at the centerline of the recovery vehicle and is the portion of the boom about which the boom is configured to move. The second end of the boom is configured to support at least one sheave that is configured to receive a cable having an engagement device, such as a hook or some other suitable recovery tool or device coupled thereto for engaging the load. Side recovery system 10 is configured so that the cable can remain received by the at least one sheave while the boom is adjusted between the first and second positions. This may advantageously reduce the amount of setup time that is needed to place side recovery system 10 in an adequate position for completing a recovery task.

According to an exemplary embodiment, the boom is adjusted between the first and second positions by being rotated about a substantially horizontal axis. As such, the boom remains within a substantially vertical plane while rotating between the first position and the second position. According to an exemplary embodiment, the horizontal axis about which the boom rotates is substantially parallel to a longitudinal axis of the recovery vehicle (i.e., an axis extending in a fore and aft direction of the vehicle). Allowing the boom to rotate in such a manner may allow the side recovery system to be used on recovery vehicle having a structure (e.g., wrecker arm, boom, underlift, body assembly, light pylon, etc.) located rearward of the side recovery system that would otherwise interfere with a boom rotating in a horizontal plane about a substantially vertical axis. Such an embodiment may be particularly suitable for a wrecker that is likely to include a relatively large wrecker arm or boom supported rearward of a cab of the vehicle.

According to an exemplary embodiment, side recovery system 10 may also include an outrigger or stabilizer system that includes one or more support members (e.g., outriggers, etc.) that are selectively adjustable between a retracted stowed position, a first use position in which the stabilizer system functions as a support foot and a second use position in which the stabilizer system functions as a spade. As a support foot, the stabilizer system rests on a ground surface and is intended to protect the recovery vehicle from tipping over sideways in the direction of a load engaged by side recovery system 10. As a spade, the stabilizer penetrates the ground surface and is intended to generate a tractive force so that the recovery vehicle resists sliding in a direction of a load engaged by side recovery system 10. According to an exemplary embodiment, the stabilizer system functions separately as either a support foot or a spade. According to another exemplary embodiment, the stabilizer system may function as a support foot and a spade at the same time to simultaneously protect against tipping and to resist sliding.

According to an exemplary embodiment, side recovery system 10 further includes a fleet angle management or winding system as part of a cable guidance system. The winding system is configured to reduce the fleet angle of the cable extending between a fleeting or lead sheave and a drum (e.g., reel, spool, etc.) of a winch, and provide for the substantially level winding of the cable on and off the drum. For purposes of the present disclosure, the phrase "fleet angle" is used broadly to refer to the measurement of an angle between the centerline of a cable and a line drawn perpendicular to the axis of the lead sheave. As the fleet angle increases, so does the wear on the cable. As such, it is desirable to minimize the fleet angle. In the vehicle towing industry, the current acceptable maximum fleet angle range is believed to be between approximately 1.5 degrees and approximately 2 degrees. These values are provided for exemplary purposes only and may vary depending on the specific application, the characteristics of the cable being used, the design of the lead sheave and/or winch or any of a variety of other factors.

One way to reduce the fleet angle is to increase the distance between the lead sheave and the drum of the winch. Unfortunately, in applications were space is limited, such as in recovery vehicles, increasing the distance between the lead sheave and the drum may not be a reasonable solution. The winding system disclosed herein is configured to reduce the distance needed between the lead sheave and the drum of the winch while still maintaining an acceptable fleet angle. According to an exemplary embodiment, the winding system includes a lead sheave that includes a base or support structure (e.g., frame, etc.) that is rotatable about an axis that is substantially perpendicular to the axis of the lead sheave and the drum of the winch. An output side of the lead sheave is aligned axially with the rotational axis of the support structure. The force imposed by the cable on an input side (i.e., drum side, etc.) of the lead sheave will cause the support structure to rotate about its axis as the cable winds on and off the drum. Such a configuration allows the input side of the lead sheave to follow the cable in a sweeping arc as the cable winds on and off the drum, while the output side of the lead sheave remains centered about the rotational axis of the support structure to keep the cable axially aligned.

As indicated above, the winding system disclosed herein allows for the distance between the lead sheave and the drum of the winch to be reduced, while reducing the fleet angle of the cable. Reducing the distance between the lead sheave and the drum allows the side recovery system to be a more compressed or compact, particularly in a vertical direction, thereby reducing the overall height of the side recovery system. Reducing the fleet angle of the cable may extend the useful life of the cable and/or facilitate level winding of the cable on and off the drum (e.g., may prevent bird-nesting of the cable, etc.).

Before discussing the details of side recovery system 10, it should be noted at the outset that references to "front," "back," "rear," "upper," "lower," "top," "bottom," "right," and "left" in this description are merely used to identify the various elements as they are oriented in the FIGURES, with "front," "back," and "rear" being relative to the direction of travel of the vehicle and "top," "bottom," "right," and "left" being relative to the perspective of the driver. These terms are not meant to limit the element which they describe, as the various elements may be oriented differently in various applications.

It should further be noted that for purposes of this disclosure, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Referring to FIG. 1 in particular, side recovery system 10 is shown according to one exemplary embodiment. According to the embodiment illustrated, side recovery system 10 generally includes a support structure (e.g., framework, etc.), shown as a base 12, a member (e.g., arm, swing arm, crane, etc.), shown as a boom 14, supported by base 12 and configured for pivotal or rotational movement relative to base 12, a cable guidance system 19 having at least one pulley and/or sheave supported at base 12 and/or boom 14, a winch 16 supported at base 12 and configured to supply a cable to cable guidance system 19, and a stabilizer system including first and second outriggers 18, 20 (shown in FIGS. 5 and 6).

Figure 2:
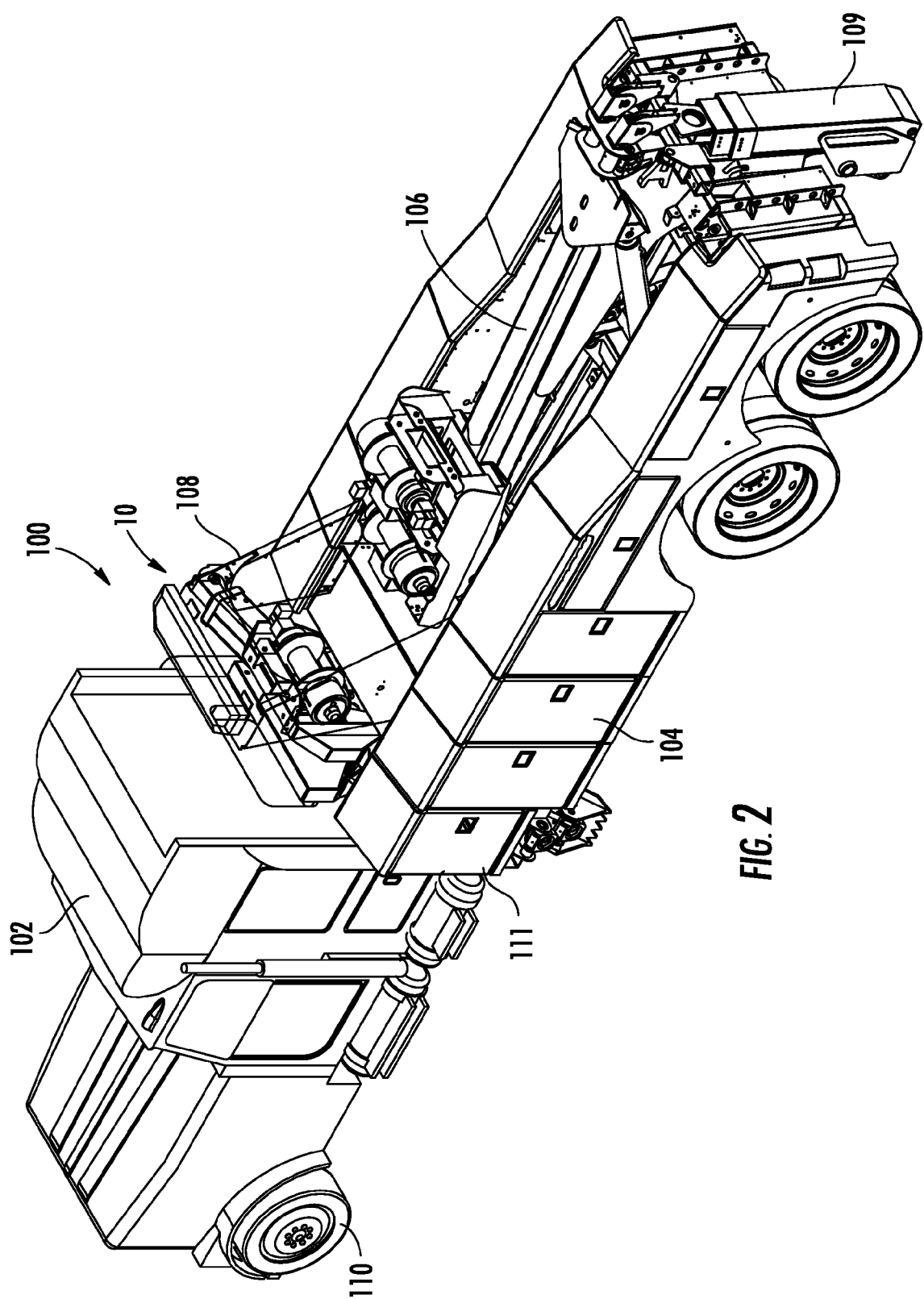
FIG. 2 is an isometric view of a vehicle according to an exemplary embodiment that includes the side recovery system shown in FIG. 1.
Figure 3:
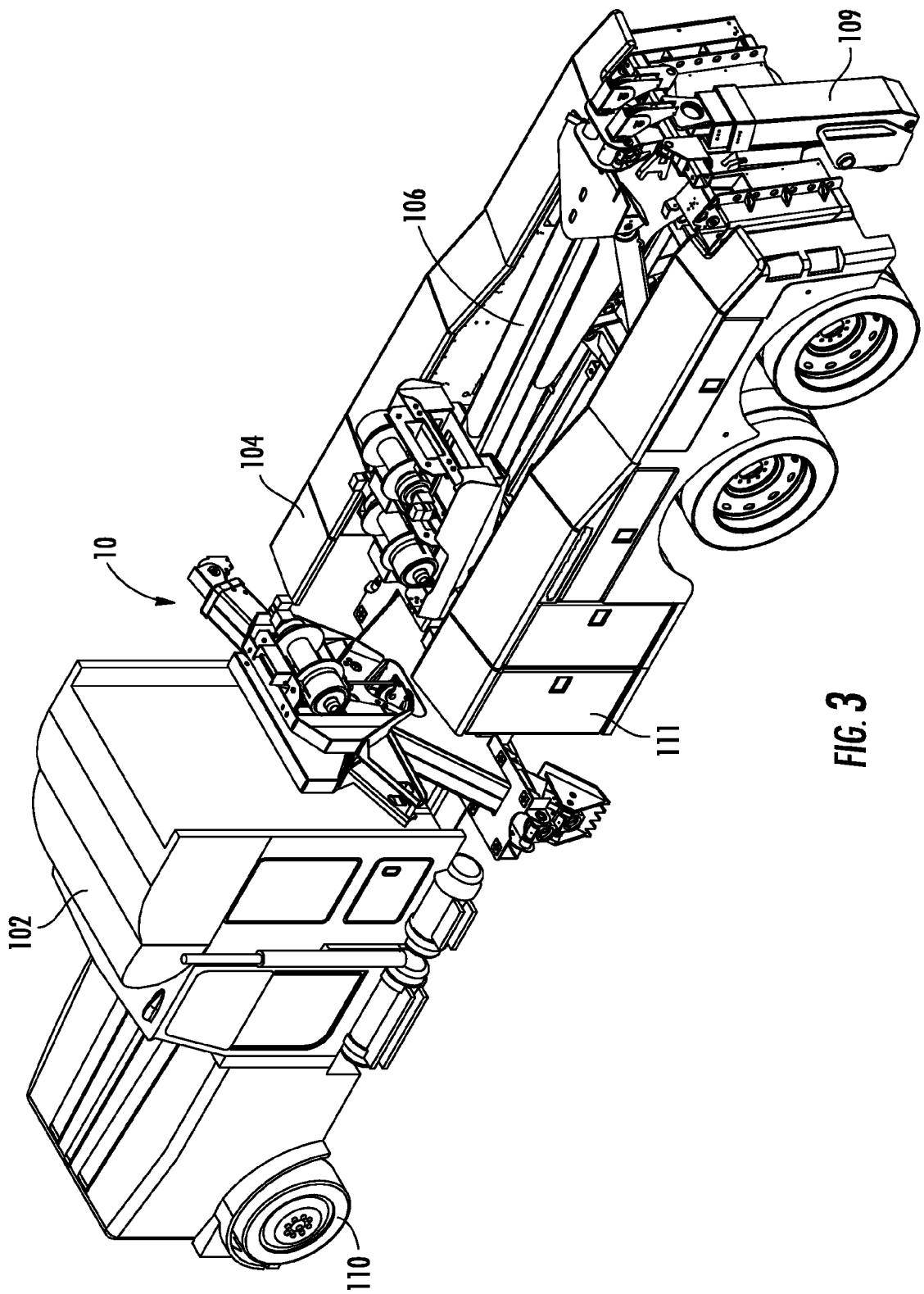
FIG. 3 is another isometric view of the vehicle of FIG. 2, but shown with at least one storage compartment removed to more clearly show the side recovery system.

FIGS. 2 and 3 illustrate side recovery system 10 with a vehicle 100. Vehicle 100 is a self-propelled recovery vehicle that, for exemplary purposes only, is shown as a wrecker (e.g., a heavy duty wrecker, tow truck, etc.). In addition to side recovery system 10, vehicle 100 generally includes a chassis (partially exposed in FIG. 3), a cab 102, a body assembly 104 supported rearward of cab 102 and having one or more storage compartments, a wrecker arm or boom assembly 106, a light pylon 108 (shown in phantom lines) and a wheel lift or underlift system 109. In FIG. 3, light pylon 108 and a portion of body assembly 104 have been removed for illustration purposes to show the positioning of side recovery system 10 on vehicle 100.

The chassis of vehicle 100 generally includes the functional parts of the vehicle such as a frame (e.g., framework, base, etc.), a suspension, an exhaust system, brakes, a drive system, a drive train, a fuel system, and/or front wheels and rear wheels 110. According to an exemplary embodiment, the chassis includes first and second frame members that are arranged as two generally parallel chassis rails extending in a fore and aft direction along a longitudinal axis of the vehicle between a first end (a front end) and a second end (a rear end). The first and second frame members are configured as elongated structural or supportive members (e.g., a beam, channel, tubing, extrusion, etc.) spaced apart laterally and defining a void or cavity which generally constitutes the centerline of vehicle 100. The plurality of drive wheels 110 are rotatably coupled to the chassis. The number and/or configuration of wheels 110 may vary depending on the embodiment. According to the embodiment illustrated, vehicle 100 utilizes ten wheels 110 (two tandem wheel sets at the second end of the vehicle and a single wheel set at the first end of the vehicle). According to the various exemplary embodiments, vehicle 100 may have any number of wheel configurations including, but not limited to, four, six, etc.

Cab 102 is carried and/or supported at the first or front end of the chassis and includes an enclosure or area capable of receiving a human operator or driver. Cab 102 may include controls associated with the manipulation of vehicle 100 (e.g., steering controls, throttle controls, etc.) and may optionally include controls for manipulating side recovery system 10, boom assembly 106, the lights on light pylon 108 and/or underlift system 109.

Body assembly 104 is carried and/or supported rearward of cab 102 and includes one or more storage compartments 111 for holding towing equipment or tools (e.g., hooks, chains, etc.). One or more of compartments 111 may also enclose controls (e.g., levers, dials, etc.) and/or a control panel for manipulating side recovery system 10, boom assembly 106, the lights on light pylon 108 and/or underlift system 109. According to an exemplary embodiment, storage compartments 111 are provided along both the left and right lateral sides of vehicle 100.

Supported along the centerline of vehicle 100 rearward of cab 102 is boom assembly 106. Boom assembly 106 is configured to support a load bearing cable having an engaging device (e.g., a hook, etc.) coupled thereto. Boom assembly 106 generally includes one or more boom sections, a first actuator device (e.g., hydraulic cylinder, etc.) for adjusting the angle of the one or more boom sections relative to the chassis and one or more winches for feeding the cable. If boom assembly 106 includes more than one boom section, boom assembly may include a second actuator device for extending and retracting the one or more extensible boom sections (e.g., telescopically extensible, etc.) relative to a base boom section.

According to an exemplary embodiment, light pylon 108 is supported rearward of cab 102 and forward of boom assembly 106. Light pylon 108 includes a base or support frame configured to support one or more lights which may be used to direct attention to vehicle 100 when a vehicle is in tow or when vehicle 100 is performing a recovery operation. According to the various alternative embodiments, light pylon 108 may have any of the variety of configurations or may be eliminated (e.g., if lights are supported on cab 102, etc.).

Supported at a second or rear end of vehicle 100 is underlift system 109. Underlift system 109 is provided for lifting and towing a vehicle by engaging the frame an/or one or more wheels of the vehicle to be towed. Underlift system 109 is movable between a retracted stowed position (shown in FIGS. 2 and 3) and an extended use position in which a boom section of the system is rotated downwards approximately 90 degrees. A cross bar member provided at a distal end of the boom is used to engage the frame of the vehicle to be carried and/or may be configured to receive a vehicle engaging mechanism for engaging the frame and/or wheels of a vehicle being carried, such as a wheel cradle.

Side recovery system 10 is configured to be supported by the chassis between the back of cab 102 and in front of boom assembly 106 and/or light pylon 108. According to an exemplary embodiment, side recovery system 10 is supported closely adjacent to the back of cab 102 so that any gap or space between a front end of side recovery system 10 and the back of cab 102 is relatively small. According to the embodiment illustrated, body assembly 104 includes storage compartments 111 that are sized and configured to substantially enclose and/or conceal at least the sides of side recovery system 10. Such an arrangement may protect the components of side recovery system 10 and/or may improve the aesthetics of vehicle 100 by providing a relatively continuous or streamlined appearance along the lateral side of the vehicle.

Side recovery system 10 is configured so that its size (e.g., depth, etc.) in a fore and aft or longitudinal direction of vehicle 100 is minimized. Such a configuration may allow for the overall length of vehicle 100 to be reduced, which may provide for improved maneuverability. Further, by reducing the overall size of side recovery system 10 in a fore and aft direction, side recovery system 10 may be added to a recovery vehicle with little or no modification to the chassis and/or body assembly 104. Side recovery system 10 is further sized so that it will not substantially cover or block a rear window (not shown) of cab 102 in an effort to improve an operator's line of sight if such a window was provided. To provide for this, the size of side recovery system 10 in a vertical direction (i.e., the overall height of side recovery system 10) is reduced or minimized.

Figure 4:
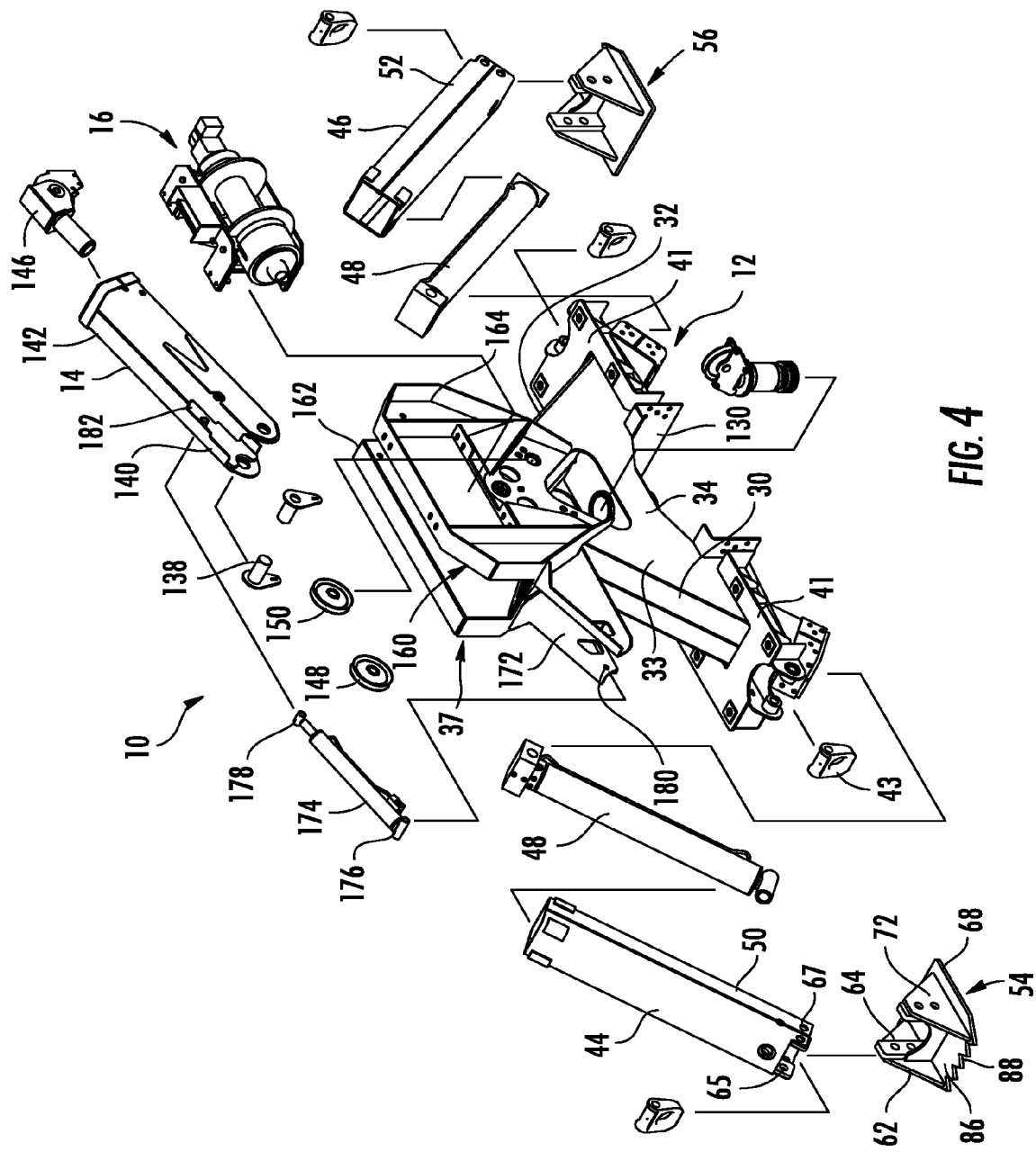
FIG. 4 is an exploded isometric view of the side recovery system shown in FIG. 1.
Figure 5:
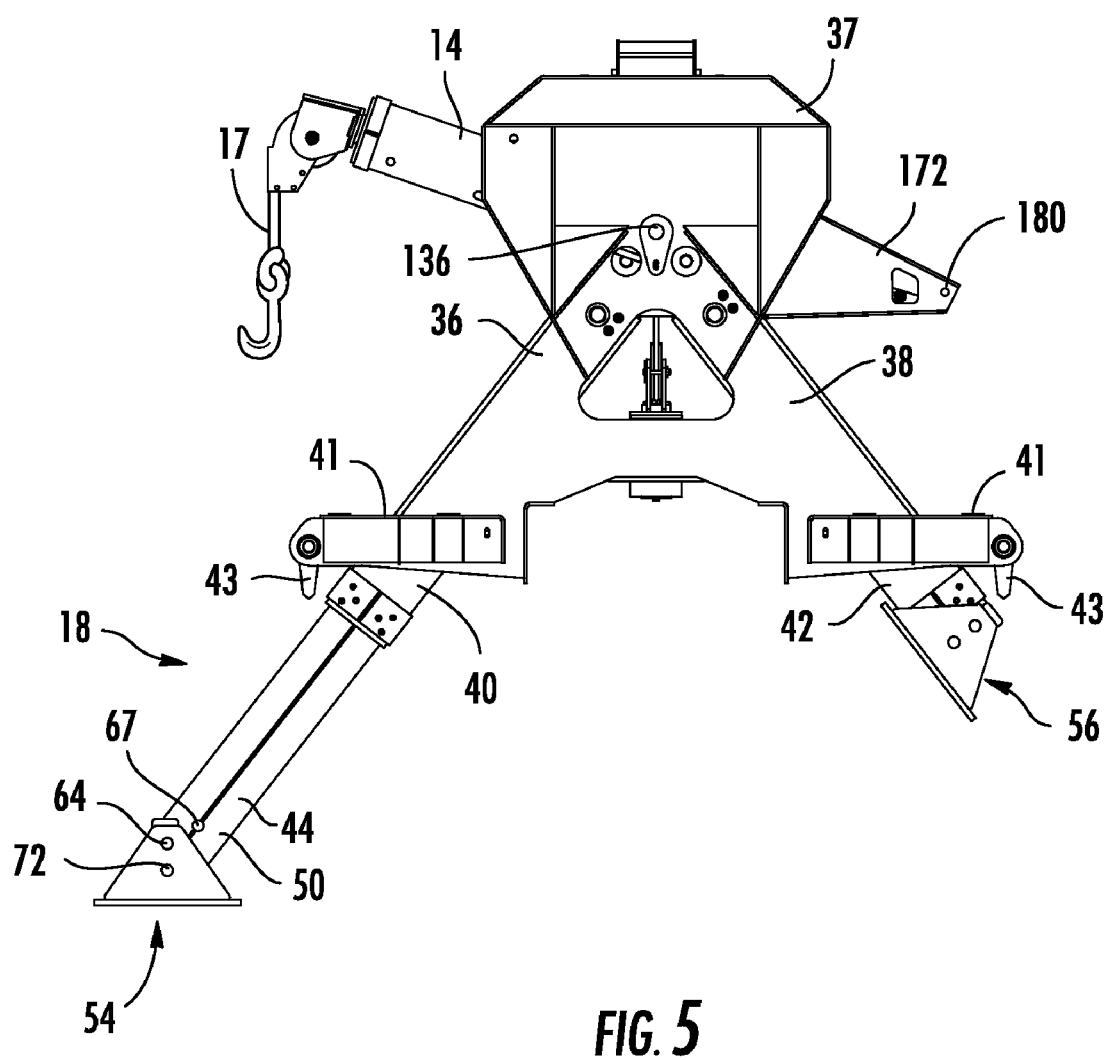
FIG. 5 is a rear view of the side recovery system of FIG. 1 illustrating the side recovery system in a first position.
Figure 6:
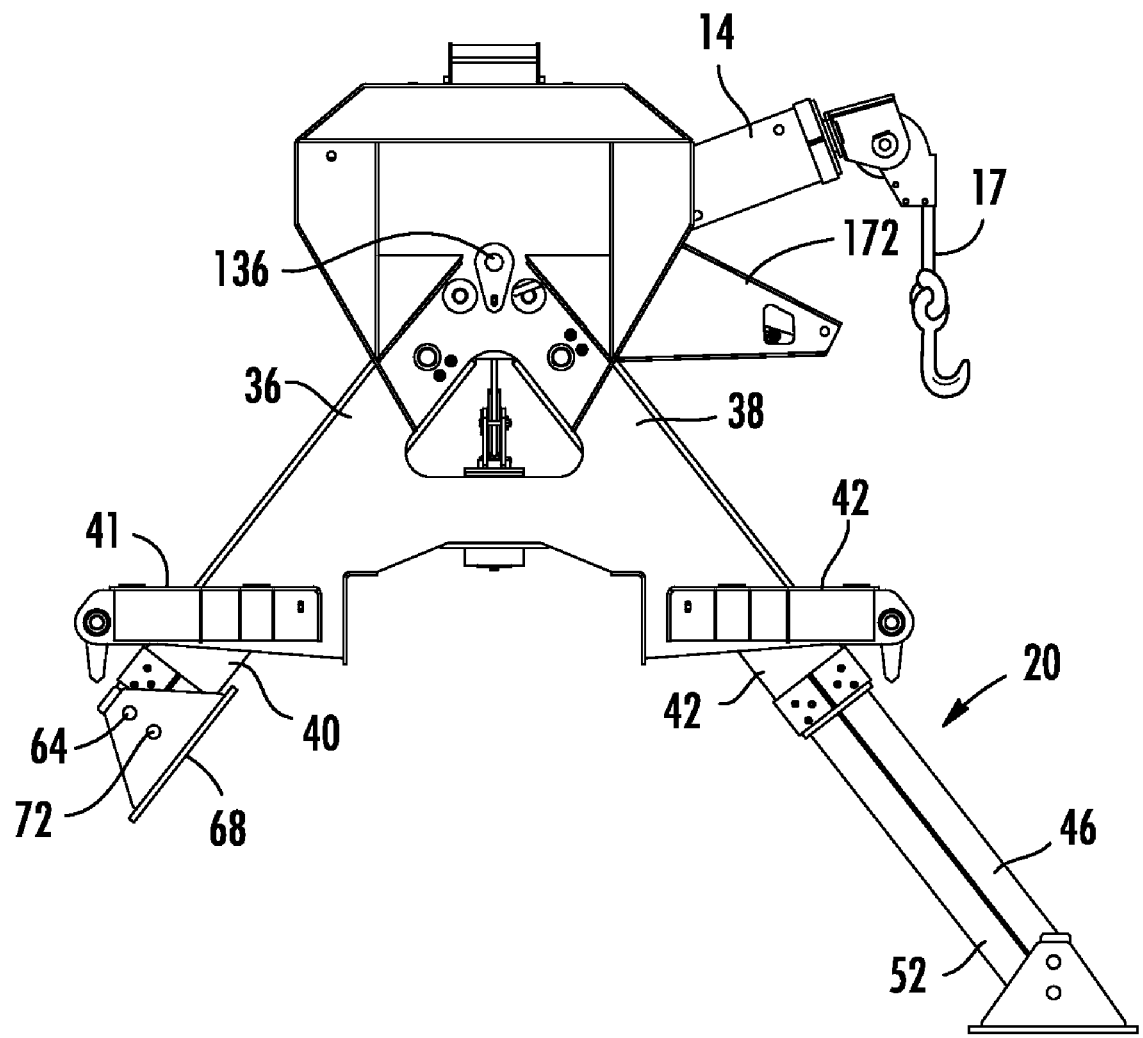
FIG. 6 is a rear view of the side recovery system of FIG. 1 illustrating the side recovery system in a second position.

Referring to FIGS. 4 through 6, side recovery system 10 and its components thereof will be described in more detail. FIG. 4 is a partially exploded view of side recovery system 10, while FIGS. 5 and 6 are rear views of side recovery system 10 (i.e., FIGS. 5 and 6 show a side of side recovery system 10 that is intended face cab 102). According to an exemplary embodiment, base 12 generally includes a first support member 30, a second support member 32 and a third support member 34. According to the embodiment illustrated, first support member 30, second support member 32 and third support member 34 cooperate to define a substantially A-shaped frame structure with first support member 30 and second support member 32 extending downwardly and outwardly relative to a centerline of vehicle 100 and third support member 34 extending generally horizontal therebetween. According to an exemplary embodiment, a cover or a panel 33 having an aperture 35 defined therein is coupled to this frame structure to substantially conceal first support member 30, second support member 32 and third support member 34.

According to an exemplary embodiment, first support member 30 and second support member 32 include upper ends 36 and 38 that converge at a base or support structure, shown as a boom support 37 and detailed below, for boom 14, one or more of the components of cable guidance system 19 and/or winch 16. According to an exemplary embodiment, upper ends 36 and 38 terminate at a height that allows boom support 37 and/or boom 14 to be supported thereat without substantially blocking a rear window (not shown) of cab 102 is provided.

First support member 30 and second support member 32 also include lower ends 40 and 42. According to an exemplary embodiment, lower ends 40 and 42 are each configured to support a structure, shown as a platform 41, which is in turn provided to support storage compartments 111 (shown in FIG. 2) of body assembly 104. According to the embodiment illustrated, platforms 41 at least partially surround lower ends 40 and 42 and supported at a substantially horizontal orientation. Platforms 41 are shown as including a plurality of apertures that are configured to receive a fastener for securing storage compartments 111 at lower ends 40 and 42. Storage compartments 111 supported at platforms 41 substantially conceal at least the sides of first support member 30 and second support member 32. Platforms 41 are also shown as providing a mounting area for one or more tie downs 43.

Lower ends 40 and 42 are also configured to support extensible members 44 (shown in FIG. 5) and 46 (shown in FIG. 6) respectively. First support member 30 and extensible member 44 cooperate to provide first outrigger 18, while second support member 32 and extensible member 46 cooperate to provide second outrigger 20. The support members and the extensible members may be constructed of high strength metals or metal alloy, such as iron or steel. Alternatively, the members may be formed from non-metallic materials such as composites, fiber reinforced composites and/or any other suitable material.

According to an exemplary embodiment, extensible members 44 and 46 are configured for telescopic extension and retraction relative to first support member 30 and second support member 32 respectively. According to the embodiment illustrated, first support member 30 and second support member 32 are tubular members having hollow interiors configured to receive extensible members 44 and 46. Extensible members 44 and 46 have outer peripheries that are substantially similar to the inner peripheries of first support member 30 and second support member 32 to facilitate translational (e.g., sliding, etc.) movement of the extensible members relative to the support members. According to an exemplary embodiment, the support members 30 and 32 and their corresponding extensible members 44 and 46 have rectangular cross sections. According to the various alternative embodiments, these members may have any of a variety of suitable cross sections including, but not limited to, circular, elliptical, triangular, etc.

According to an exemplary embodiment, the telescopic extension and retraction of extensible members 44 and 46 is achieved using one or more actuator devices 48 (shown in FIG. 4). According to the embodiment illustrated, actuator device 48 is a hydraulic actuator device or cylinder having a first end coupled to first support member 30 and a second end coupled to extensible member 44. Although a single hydraulic actuator device is shown for each outrigger, more than one hydraulic actuator device may be used. According to the various exemplary embodiments, actuator device 48 may be any other type of actuator capable of producing mechanical energy for exerting forces suitable for moving the extensible members and supporting a load acting on the outriggers when engaging the ground and/or at least partially supporting the weight of vehicle 100. According to still further alternative embodiments, the outriggers may be manual systems wherein a user is required to move the extensible members relative to the support members without the assistance of an actuator (e.g., by releasing a locking pin and allowing the extensible member to slide to an extended position, etc.).

With extensible members 44 and 46 deployed (i.e., selectively moved to an extended use position), outriggers 18 and 20 provide a wider base or stance for stabilizing vehicle 100 in a lateral direction. Outriggers 18 and 20 may also be capable of stabilizing vehicle 100 in a fore and aft direction. During a typical operation of side recovery system 10, either outrigger 18 or outrigger 20 will be deployed while the other outrigger remains in its retracted stowed position. For example, if side recovery system 10 is being used to manipulate a load that is on the left side of vehicle 100, outrigger 18 will be deployed while outrigger 20 remains stowed (as shown in FIG. 5). Likewise, if side recovery system 10 is being used to manipulate a load that is on the right side of vehicle 100, outrigger 20 will be deployed while outrigger 18 remains stowed (as shown in FIG. 6). However, both outriggers 18 and 20 may be deployed simultaneously to increase the overall stability of vehicle 100 during a recovery operation. For example, both outriggers 18 and 20 may be deployed simultaneously while boom assembly 106 is being used to provide additional support to vehicle 100.

It should be noted that storage compartments 111 supported on platforms 41 and substantially concealing at least the sides of first support member 30 and second support member 32 do not have to be moved (e.g., removed, adjusted, etc.) for outriggers 18 and 20 to move between the extend and retracted positions. These storage compartments 111 remain stationary during the operation of side recovery system 10.

For purposes of this disclosure, the free ends or end-most portions of extensible members 44 and 46 are referred to as distal ends 50 and 52. Distal ends 50 and 52 are each configured to support a ground engaging device, shown as stabilizer feet 54 and 56, used to stabilize vehicle 100 during operation of side recovery system 10. According to an exemplary embodiment, stabilizer feet 54 and 56 are selectively adjustable between a first position (shown by stabilizer foot 54 in FIG. 5) wherein stabilizer feet 54 and 56 function as support feet and a second position (shown by stabilizer foot 56 in FIG. 5) wherein stabilizer feet 54 and 56 function as spades. Such a design allows vehicle 100 to be more versatile and/or adaptable to various conditions that may encountered when using side recovery system 10.

As a support foot, stabilizer feet 54 and 56 engage a ground surface (e.g., asphalt, dirt, gravel, concrete, sand, etc.) by resting or lying on top of ground surface. This type of engagement with the ground is intended to protect vehicle 100 from tipping over sideways in the direction of a load being engaged by side recovery system 10. As a spade, stabilizer feet 54 and 56 engage the ground surface by penetrating (e.g., digging into, etc.) the ground surface. This type of engagement with the ground is intended to generate a tractive force so that vehicle 100 resists sliding in a direction of a load being engaged by side recovery system 10.

For brevity, only the configuration of stabilizer foot 54 is detailed herein since the configuration of stabilizer foot 56 is substantially the same. Referring to FIG. 4, stabilizer foot 54 includes a base or pad 68 that is shown as a substantially flat rectangular member. Pad 68 has a bottom surface that is configured to rest upon the ground surface. According to the various alternative embodiments, pad 68 may have any of a variety of shapes (e.g., circular, triangular, etc.).

Upwardly extending from pad 68 is a pair of spaced apart side members 62 that are configured to receive distal end 50 of extensible member 44 therebetween. Side members 62 defines a first pair apertures, shown as openings 64, configured to be aligned with corresponding apertures, shown as openings 65, provided in distal end 50 of extensible member 44. Openings 64 and 65 are configured to receive a pivot pin or shaft (not shown) which couples stabilizer foot 54 to extensible member 44. The pivot shaft extending through openings 64 and 65 defines an axis about which stabilizer foot 54 is configured to rotate relative to extensible member 44. Pivotally coupling stabilizer foot 54 to distal end 50 of extensible member 44 allows stabilizer foot 54 to provide stable footing on uneven surfaces by allowing stabilizer foot 54 to substantially conform to the contour of the ground surface. Pivotally coupling stabilizer foot 54 to distal end 50 of extensible member 44 also allows stabilizer foot 54 to be selectively moved between the first and second positions.

Side members 62 also define a second pair of apertures, shown as openings 72. According to the embodiment illustrated, openings 72 are provided under openings 64 in a substantially vertical alignment therewith. As detailed below, openings 72 are configured to be aligned with corresponding apertures, shown as openings 67, provided in distal end 50 of extensible member 44 to support stabilizer foot 54 in second position. According to the embodiment illustrated, openings 67 are provided rearward of openings 65 in a substantially horizontal alignment therewith. Openings 72 are configured to selectively receive a latching or locking mechanism (e.g., locking pin, etc.), which is configured to be selectively released and engaged to allow stabilizer foot 54 to move between the first and second positions.

According to an exemplary embodiment, pad 68 also defines a friction surface 86 configured to penetrate a ground surface and generate a tractive or frictional force in the direction of a load being engaged by side recovery system 10 to prevents vehicle 100 from moving (e.g., sliding, etc.) during operation of side recovery system 10. Preferably, friction surface 86 will be positioned substantially perpendicular with respect to the cable outwardly extending from side recovery system 10 to the load being engaged. The closer that friction surface 86 is to perpendicular to the cable, the greater then tractive force that can be generated, and therefore, the greater the stability of vehicle 100.

According to the embodiment illustrated, pad 68 includes a plurality of teeth 88 along a lower edge of friction surface 86. Teeth 88 function to further improve penetration of friction surface 86 into the ground during operation of side recovery system 10. According to the various alternative embodiments, teeth 88 may be designed to have any of a number for profiles (e.g., conical, pyramidal, etc.).

When outrigger 18 of side recovery system 10 is not being used, stabilizer foot 54 is preferably retained in the second position. Retaining the stabilizer foot 54 in the second position during non-use will reduce the overall width of side recovery system 10 since stabilizer foot 54 extends outward more in the first position than in the second position. Retaining the stabilizer foot 54 in the second position during non-use may also reduce the likelihood that teeth 88 is inadvertently engage an object adjacent to a lateral side of vehicle 100 (e.g., another vehicle, a building, an operator, etc.) since teeth will be pointing downward. To retain stabilizer foot 54 in the second position, openings 72 and 67 are aligned and selectively engaged with a locking device. This can be done manually or using an actuator. To move stabilizer foot 54 to the first position, the lock device is disengaged thereby allowing stabilizer foot 54 to rotation about the pivot pin engaging openings 64 and 65.

Figure 7:
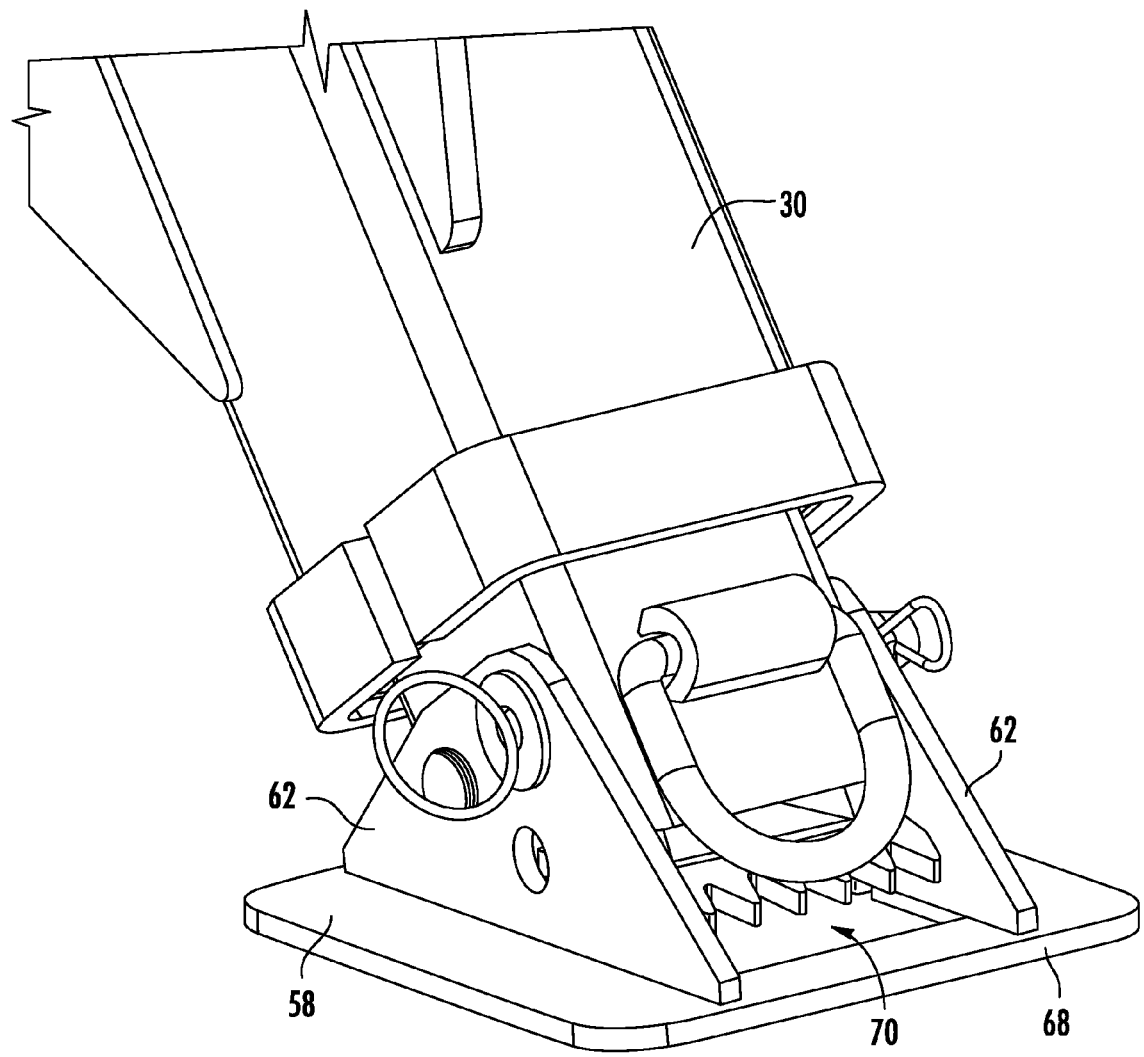
FIG. 7 is a partial isometric view of a stabilizer according to another exemplary embodiment illustrated in a first position.
Figure 8:
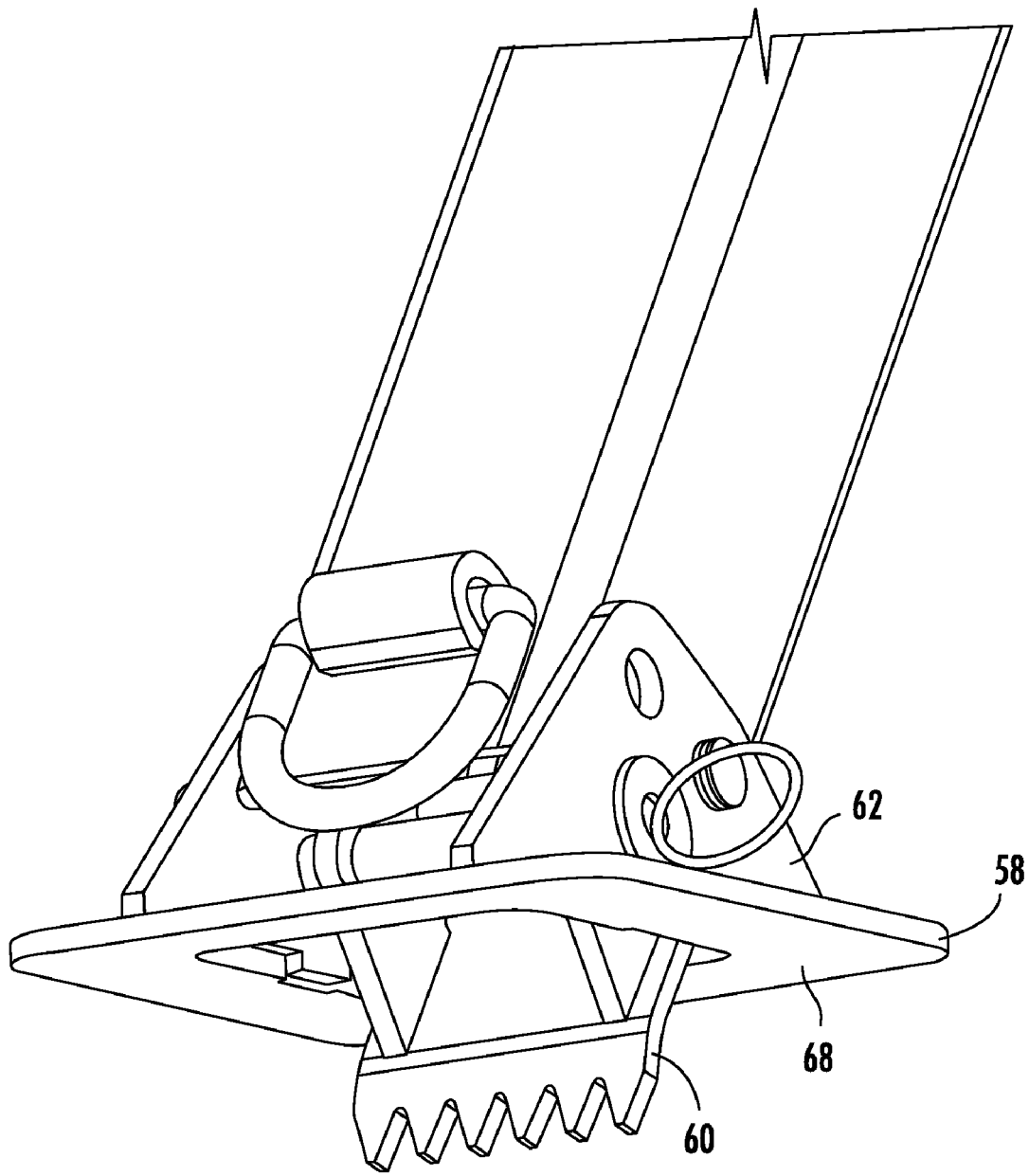
FIG. 8 is another partial isometric view of the stabilizer of FIG. 7 illustrated in a second position.
Figure 9:
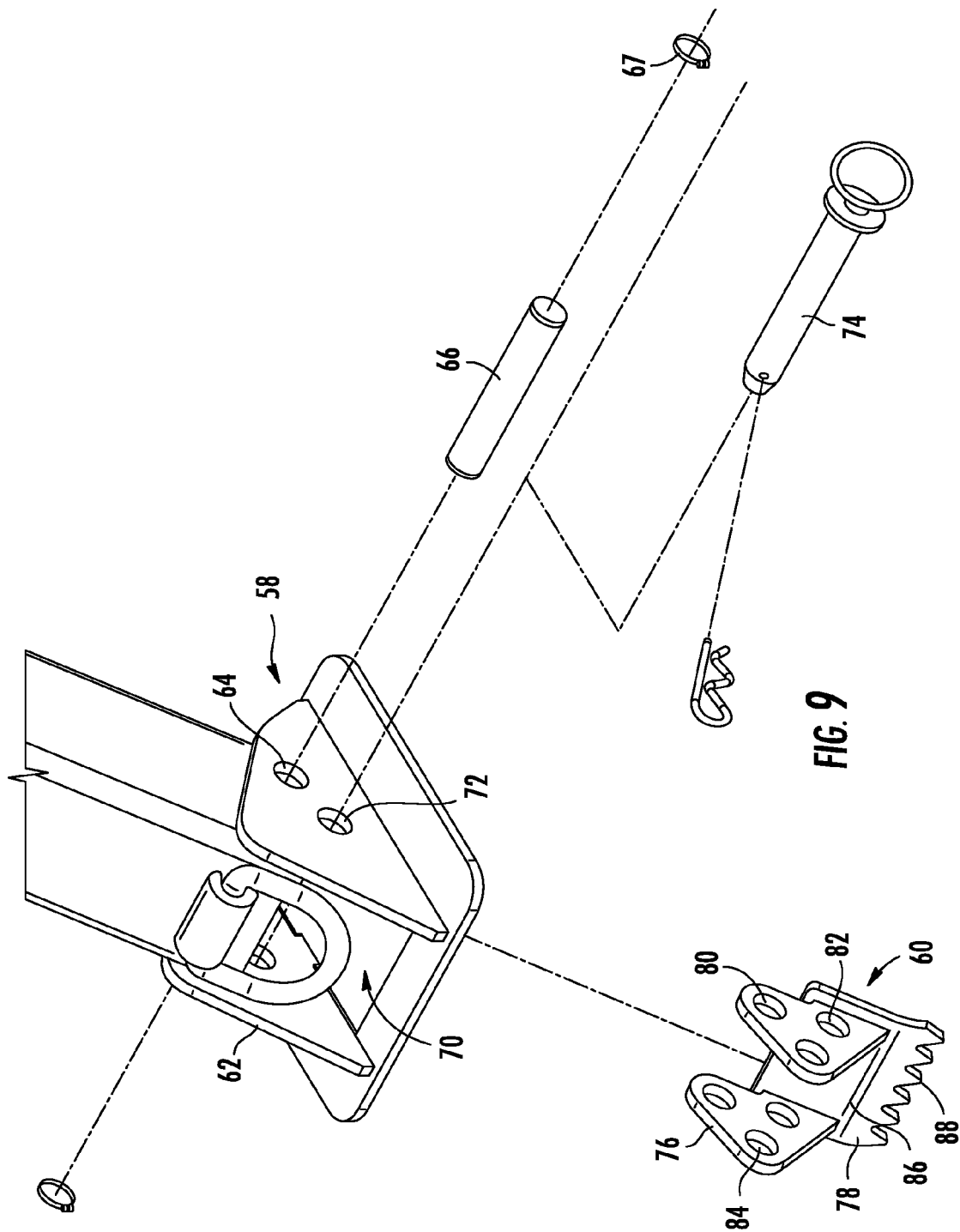
FIG. 9 is an exploded isometric view of the stabilizer shown in FIGS. 7 and 8.

Referring to FIGS. 7 through 9, a stabilizer foot is shown according to another exemplary embodiment. Like the stabilizer foot configuration detailed above, the stabilizer foot shown in FIGS. 7 through 9 is selectively adjustable between a first position (shown in FIG. 7) wherein the stabilizer foot functions as just a support foot and a second position (shown in FIG. 8) wherein the stabilizer foot functions as both a support foot and a spade. A difference between the configurations is that the stabilizer foot shown in FIGS. 7 through 9 can be functional as both a stabilizer foot and a spade at the same time (i.e., when the stabilizer foot is in the second position) unlike the stabilizer foot shown in FIGS. 1 through 6 in which the stabilizer foot is adjusted to be functional as either a stabilizer foot or a spade.

Referring to FIG. 9 in particular, a partially exploded view of stabilizer foot 54 is shown. Stabilizer foot 54 generally includes a base portion 58 and a movable spade portion 60. Spade portion 60 is selectively movable relative to base portion 58 to provide for the first and second positions of stabilizer foot 54. Base portion 58 includes a substantially horizontal or flat portion, shown as a pad 68, that has a bottom surface that is configured to rest upon the ground surface. Pad 68 further defines an aperture 70 configured to receive spade portion 60. According to the embodiment illustrated, pad 68 is a substantially rectangular member that defines a substantially rectangular aperture 70. According to the various alternative embodiments, pad 68 and/or aperture 70 may have any of variety of shapes (e.g., circular, triangular, etc.).

Upwardly extending from pad 68 is a pair of spaced apart side members 62 that are configured to receive distal end 50 of extensible member 44 therebetween. According to the embodiment illustrated, side members 62 are support adjacent to opposite sides of aperture 70. Side members 62 define a pair apertures, shown as openings 64, configured to be aligned with corresponding apertures provided in distal end 50 of extensible member 44. Openings 64 are configured to receive a pivot pin or shaft 66 which couples stabilizer foot 54 to extensible member 44 and allows stabilizer foot 54 to pivot or rotate relative to extensible member 44. One or more locking devices 67 (e.g., locking rings, clips, etc.) are used to secure pivot shaft 66 to stabilizer foot 54 and extensible member 44. Pivot shaft 66 defines an axis about which stabilizer foot 54 is configured to rotate relative to extensible member 44. Pivotally coupling stabilizer foot 54 to distal end 50 of extensible member 44 allows stabilizer foot 54 to provide stable footing on uneven surfaces by allowing stabilizer foot 54 to substantially conform to the contour of the ground surface.

Side members 62 also define a second pair of apertures, shown as openings 72. As detailed below, openings 72 are configured to be aligned with corresponding openings provided in spade portion 60 to support spade portion 60 in either the first position or the second position. Openings 72 are configured to receive a latching or locking mechanism, shown as a locking pin 74, which is configured to be selectively released and engaged to allow spade portion 60 to move between the first position and the second position.

Spade portion 60 generally includes a pair of spaced apart and generally upright adjustment members 76 and an anchor blade 78. Adjustment members 76 extend outward from anchor blade 78 and include a structure that allows spade portion 60 to be secured in both the first position (e.g., retracted position, etc.) and the second position (e.g., extended position, etc.). Adjustment members 76 define a first pair of apertures, shown as openings 80, a second pair of apertures, shown as openings 82, and a third pair of apertures, shown as openings 84. According to an exemplary embodiment, spade portion 60 is configured to be rotated relative to base portion 58 to achieve the first position and the second position. Openings 80 are configured to align with openings 64 in base portion 58 and the corresponding openings in extensible member 44 and to receive pivot shaft 66 to provide for the rotational movement of spade portion 60 relative to base portion 58.

Openings 82 are configured to be aligned with openings 72 in base portion 58 and receive locking pin 74 when stabilizer foot 54 is to be moved to the first position. Openings 84 are configured to be aligned with openings 72 in base portion 58 and receive locking pin 74 when stabilizer foot 54 is to be moved to the second position. When an operator desires to change the configuration of stabilizer foot 54 between the first position and the second position, the operator will release locking pin 74 (e.g., by removing the pin, etc.) and will thereafter rotate spade portion 60 about pivot shaft 66 until the desired position is achieved and either openings 82 or openings 84 are aligned with openings 72. The operator will then reengage locking pin 74 to secure stabilizer foot 54 in the desired position.

According to the various alternative embodiments, any number of openings, at any number of locations, made be provided in spade portion 60 to achieve the desired positioning of spade portion 60 relative to base portion 58. According to further alternative embodiments, a plurality of adjustment openings or holes may be provided in base portion 58 (e.g., side members 62) and a single alignment opening or hole may be provided in spade portion 60 (e.g., adjustment members 76, etc.). According to still further alternative embodiments, additional holes may be provided so that spade portion 60 may be locked into a position (e.g., an intermediate position, etc.) that is between the first position and the second position.

According to an exemplary embodiment, anchor blade 78 has a generally flat configuration that defines a friction surface 86. Anchor blade 78 can include a tapered cross section that allows the anchor blade to more easily penetrate a ground surface and generate a tractive or frictional force in the direction of a load being engaged by side recovery system 10 that prevents vehicle 100 from moving (e.g., sliding, etc.) during operation of side recovery system 10.

According to the embodiment illustrated, anchor blade 78 includes a plurality of teeth 88 along a lower edge of friction surface 86. Teeth 88 function to further improve penetration of anchor blade 78 into the ground during operation of side recovery system 10. According to the various alternative embodiments, teeth 88 may be designed to have any of a number for profiles (e.g., conical, pyramidal, etc.).

When spade portion 60 is selectively moved to and secured in the first position, anchor blade 78 is sized to fit within the periphery of aperture 70. According to an exemplary embodiment, when spade portion 60 is in the first position, anchor blade 78 may be recessed or offset from the bottom surface of pad 68 a distance that does not allow anchor blade 78 to substantially contact the ground surface when the bottom surface of pad 68 engages the ground surface. According to another exemplary embodiment, when spade portion 60 is in the first position, a backside of anchor blade 78 (i.e., a substantially flat surface opposite friction surface 86) may be configured to be substantially coplanar with the bottom surface of pad 68. Such a configuration may allow spade portion 60 to assist pad 68 in stabilizing vehicle 100 when stabilizer foot 54 is in the first position.

When spade portion 60 is selectively moved to and secured in the second position, anchor blade 78 is configured to penetrate the ground surface while the bottom surface of pad 68 is configured to rest on top of the ground surface. Such a configuration advantageously allows stabilizer foot 54 to protect vehicle 100 against sliding and tipping at the same time. Anchor blade 78 may be configured or sized so that the point at which the bottom surface of pad 68 would come into contact with the ground surface can be controlled.

Referring back to FIGS. 4 through 6, third support member 34 is shown as extending in a substantially horizontal direction between first support member 30 and second support member 32. Third support member 34 acts as a brace between first support member 30 and second support member 32 to increase the overall rigidity of the system. According to an exemplary embodiment, third support member 34 is configured to support one or more components of cable guidance system 19 and/or winch 16. According to the various alternative embodiments, third support member 34 may be eliminated if not needed for stability and/or as a mounting structure. According to further alternative embodiments, one or more first support member 30, second support member 32 and third support member 34 may be integrally formed as a one-piece unitary member.

According to the embodiment illustrated, third support member 34 lies within substantially the same vertical plane as first support member 44 and second support member 46. Positioning the components of side recovery system 10 within substantially the same vertical plane allows the size of side recovery system 10 to be reduced in the fore and aft direction of vehicle 100. Third support member 34 is configured to be supported on the rails of the chassis and includes a structure for mounting side recovery system 10 to the chassis. To facilitate the securement of side recovery system 10 to the chassis, a pair of mounts (e.g., brackets, etc.), shown as flanges 130, are provided. Flanges 130 define a plurality of apertures (e.g., openings, holes, etc.) that are configured to be aligned with corresponding apertures in the chassis to receive suitable fasteners (e.g., bolts, etc.) for securing side recovery system 10 to the chassis. According to the various alternative embodiments, side recovery system 10 may be secured to the chassis using a variety of known or otherwise suitable techniques including, but not limited to, a welding operation, etc.

As mentioned above, upper ends 36 and 38 of first and second support members 30 and 32 converge at boom support 37. According to an exemplary embodiment, boom support 37 is configured to support boom 14, one or more components of cable guidance system 19 and winch 16. Boom support 37 also includes an aperture that allows cable 17 to extend from cable guidance system 19 to boom 14.

According to an exemplary embodiment, boom support 37 includes a cavity 160 (e.g., recess, etc.) configured to receive boom 14. According to the embodiment illustrated, cavity 160 is defined by a first or front wall 162 and second or rear wall 164 and a third or bottom wall 166. Front wall 162 and rear wall 164 are spaced apart in a fore and aft direction of vehicle 100 a distance that is substantially equal to the width of boom 14. Bottom wall 166 has a substantially truncated V-shaped cross sectional profile having a first or left leg 168 and a second or right leg 170. Left leg 168 and right leg 170 of bottom wall 146 are substantially linear sections that are configured to support boom 14.

The angle at which left leg 168 and right leg 170 are orientated at may be used to at least partially control the angle at which boom 14 is orientated at when moved between the first and second positions. For example, boom 14 may be allowed to freely rotate until engaging left leg 168 and right leg 170. A pad (e.g., wear-resistant surface, bearing surface, cushion device, etc.) may be provided along an outer surface of left leg and right leg to reduce wear between boom 14 and boom support 37.

According to an exemplary embodiment, left leg 168 and right leg 170 extend upwardly and outwardly at an angle between approximately 0 degrees and approximately 45 degrees relative to a horizontal axis. For example, left leg 168 and right leg 170 may each extend upwardly and outwardly in opposite directions at an angle that is approximately 20 degrees relative to a horizontal axis. In such an embodiment, boom 14 will rotate approximately 140 degrees between the first and second positions. According to the various alternative embodiments, left leg 168 and right leg 170 may be orientated at any of a number of angles, including angles greater than or less than the range provided above.

As stated above, boom 14 is configured to rotate about a substantially horizontal axis that is substantially parallel with a longitudinal axis of vehicle 100 when moving between the first and second positions. Boom 14 extends between a first end 140 and a second end 142. First end 140 is configured to be supported near or at the centerline of vehicle 100 and defines a pair of apertures 144. Second end 142 is configured to support a first pulley or sheave 146. Sheave 146 includes an input side configured to receive the load bearing cable 17 from winch 16 and an output side configured to provide the cable to the load to be manipulated. According to the embodiment illustrated, first sheave 146 is coupled to a bracket that is configured to rotate about a first axis that is substantially parallel with boom 14.

According an exemplary embodiment, boom 14 includes a single boom section. According the various alternative embodiments, boom 14 may include one or more extensible sections (e.g., telescoping sections, etc.) so that the length of boom 14 can be selectively adjusted. If boom 14 includes multiple boom sections, boom 14 may additionally include an actuator device for extending and retracting the multiple boom sections relative to each other.

To facilitate the rotational movement of boom 14, boom support 37 includes a pair of apertures 136 configured to be aligned with apertures 144 and receive a pivot shaft 138 about which boom 14 can rotate. According to an exemplary embodiment, apertures 136 are substantially aligned with a centerline of vehicle 100 when side recovery system 10 is mounted to the chassis. According to the embodiment illustrated, apertures 136 are provided in front wall 162 and rear wall 164 of boom support 37.

Outwardly extending from a lateral side of boom support 37 is an actuator support member (e.g., bracket, arm, etc.), shown as an extension 172. Extension 172 is configured to support an actuator 174 used to rotate boom 14 about pivot shaft 138 between the first and second positions. According to an exemplary embodiment, extension 172 is provided on the left side of side recovery system 10 and includes a first member coupled to front wall 162 and a second member coupled to rear wall 164. The first and second members of extension 172 are spaced apart in a substantially fore and aft direction of vehicle 100 to provide a gap or space for receiving actuator 174.

According to the embodiment illustrated, actuator 174 is a hydraulic actuator device or cylinder having a first end 176 pivotally coupled to extension 172 and a second end 178 pivotally coupled to boom 14. A pair of apertures 180 are provided in the first and second members of extension 172 that are configured to receive a pivot shaft about which first end 176 of actuator 174 is configured to rotate. Similarly, a pair of apertures 182 are provided in boom 14 that are configured to receive a pivot shaft about which second end 178 of actuator 174 is configured to rotate. Apertures 182 are provided close to an edge of boom 14 that is closet to actuator 174. To allow second end 178 of actuator 174 to reach boom 14, an aperture (e.g., cutout, opening, etc.), shown as a substantially rectangular window 180 in FIG. 1, is provided in left leg 168 of bottom wall 166.

The retraction and extension of actuator 174 rotates boom 14 about pivot shaft 138. For example, boom 14 will be in the first position (i.e., at the left side of vehicle 100) when actuator 174 is fully retracted and in the second position (i.e., at the right side of vehicle 100) when actuator is fully extended. Although a single hydraulic actuator device is shown for moving boom 14, more than one hydraulic actuator device may be used. According to the various exemplary embodiments, actuator 174 may be any other type of actuator capable of producing mechanical energy for exerting forces suitable for moving boom 14. According to still further alternative embodiments, boom 14 may be a manual system wherein a user is required to rotate boom 14 about pivot shaft 138 without the assistance of an actuator.

Boom support 37 further includes a structure for supporting winch 16, shown as a winch mount 184. Winch mount 184 is provided along rear side of rear wall 164 and is configured to support winch 16 so that the rotation axis of a drum 186 of winch 16 is substantially perpendicular to a longitudinal axis of vehicle 100. According to the embodiment illustrated, winch mount 184 includes a first and second flanges that are spaced apart in a substantially vertical direction. The flanges include a plurality of apertures configured to be aligned with corresponding apertures on winch 16 for receiving a fastener.

Figure 10:
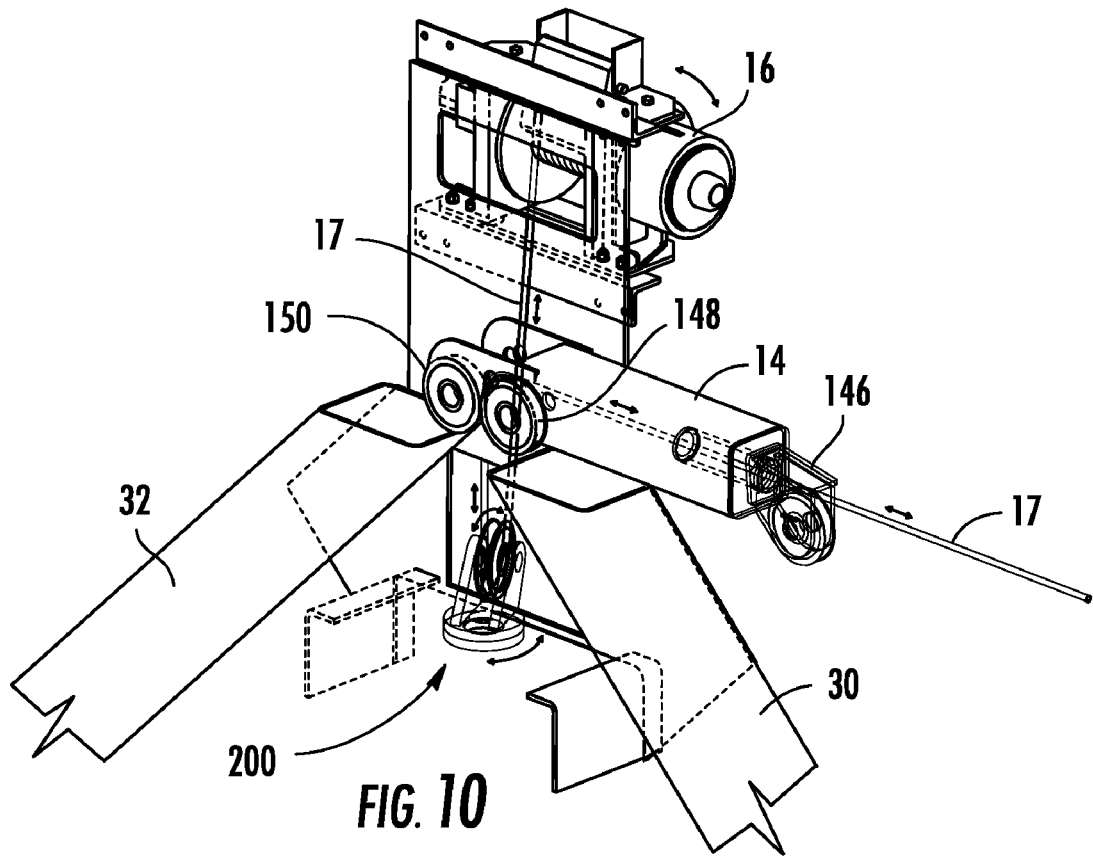
FIG. 10 is an isometric view of a side recovery system having a fleet angle management system according to an exemplary embodiment.

Referring to FIG. 10, cable guidance system 19 is shown according to an exemplary embodiment. Cable guidance system 19 is configured to guide or otherwise direct the movement of cable 17 between winch 16 and first sheave 146. According to an exemplary embodiment, cable guidance system 19 allows cable 17 to remain received by or coupled to first sheave 146 as boom 14 is selectively moved between the first and second positions. The free end of cable 17 extending from first sheave 146 is configured to support a hook or some other typed of device configured to engage the load to be manipulated by side recovery system 10. Allowing cable 17 to remain engaged with cable guidance system 19 during the movement of boom 14 between the first position and the second position, may reduce the amount of setup time that is needed to configure side recovery system 10 for operation.

According to an exemplary embodiment, cable guidance system 19 includes a second sheave 148, a third sheave 150 and a fleet angle management or winding system 200. Cable guidance system 19 is configured so that cable 17 travels from a drum of winch 16 to winding system 200, then from winding system 200 to second sheave 148 and/or third sheave 150, and then from second sheave 148 or third sheave 150 to first sheave 146.

Second sheave 148 and third sheave 150 are mounted between front wall 162 and rear wall 164 of boom support 37 about first and second pivot shafts respectively. According to an exemplary embodiment, second sheave 148 and third sheave 150 may be received within the lower end of boom 14 (see FIG. 10). The pivot shafts define axes of rotation for second sheave 148 and third sheave 150 that are substantially parallel to the longitudinal axis of vehicle 100.

The first and second pivot shafts are provided at substantially the same height, but are spaced apart from each other in a lateral direction. Preferably, the first and second pivot shafts are equally spaced in opposite directions from a centerline of vehicle 10. The distance that second sheave 148 and third sheave 150 are spaced apart in a lateral direction may be dependent on the diameter of the sheaves and/or the thickness of the cable. According to an exemplary embodiment, the distance with second sheave 148 and third sheave 150 is such that there is little or no gap between the outer periphery of second sheave 148 and third sheave 150.

Second sheave 148 and third sheave 150 each include an input side and an output side. For purposes of the present disclosure, the input side refers to the side of the sheave that receives cable 17 from winding system 200, while the output side refers to the side of the sheave that provides cable 17 to first sheave 146. According to an exemplary embodiment, cable 17 will engage the output side of second sheave 148 when boom 14 is in the first position and will engage the output side of third sheave 150 when boom 14 is in the second position. According to an exemplary embodiment, cable 17 will engage the input side of both second sheave 148 and first sheave 150 regardless of the position of boom 14 because of how closely second sheave 148 and third sheave 150 are spaced together. Such a configuration reduces the likelihood that cable 17 will be disengaged from second and third sheaves when boom 14 is rotated between the first and second position.

According to the various alternative embodiments, only the input sides of one of second sheave 148 and third 150 may be engaged by cable 17 at a time. For example, cable 17 may engage only the input side of second sheave 148 when boom 14 is in the first position and will engage only the input side of third sheave 150 when boom 14 is in the second position. Again, whether cable 17 engages one or more of the input sides of second sheave 148 and third sheave 150, may be controlled at least partially by the positioning of the sheaves relative to each other.

Figure 11:
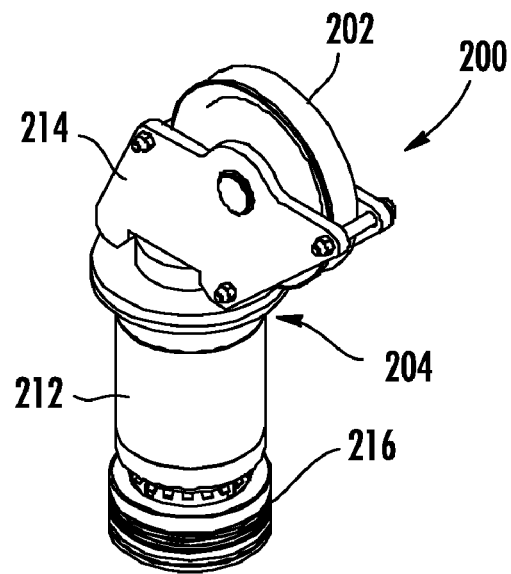
FIG. 11 is an isometric view of a sheave of the fleet angle management system of FIG. 10.

Referring to FIGS. 10 and 11, winding system 200 is shown according to an exemplary embodiment. Winding system 200 generally includes a fleeting or lead sheave 202 and a support structure 204 (e.g., frame, etc.). Winding system 200 is configured to reduce the fleet angle of cable 17 extending between lead sheave 202 and the drum (e.g., reel, spool, etc.) of winch 16 and provide for the substantially level winding of 17 cable on and off the drum. As the fleet angle increases, so does the wear on the cable. As such, it is desirable to reduce the fleet angle. As indicated above, winding system 200 allows for the vertical distance between lead sheave 202 and the drum of winch 16 to be reduced. Reducing the distance between lead sheave 202 and the drum allows side recovery system 10 to be a more compressed or compact thereby reducing the overall height of side recovery system 10.

Figure 14:
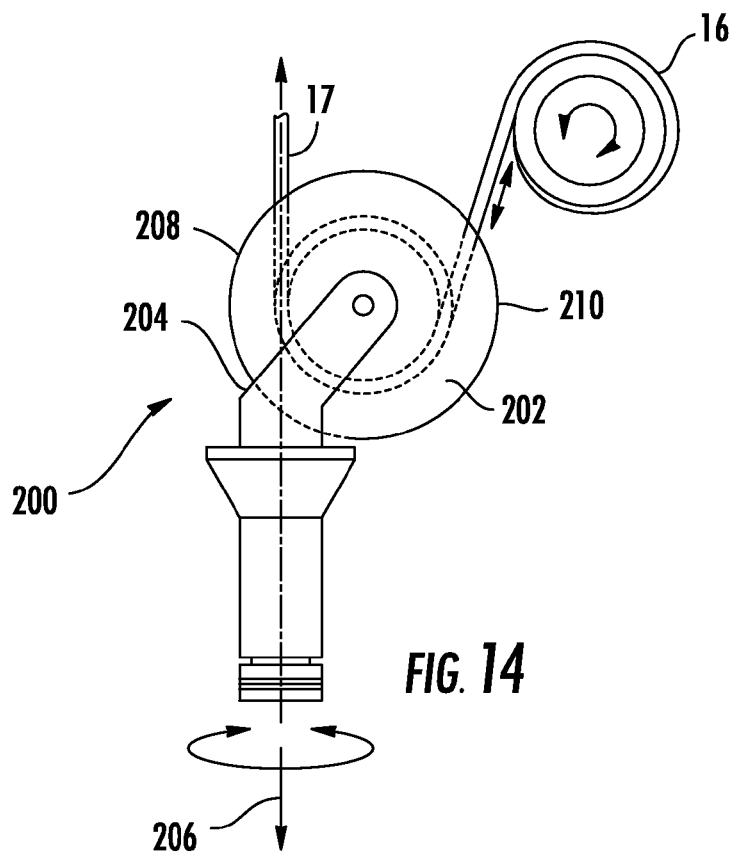
FIG. 14 is side view of the sheave of FIG. 11 and a winch of the fleet angle management system showing cable path according to an exemplary embodiment.

Winding system 200 is configured to reduce the fleet angle while reducing the distance needed between lead sheave 202 and the drum of 16 winch. According to an exemplary embodiment, support structure 204 of lead sheave 202 is mounted to third support member 34 and is rotatable about an axis that is substantially perpendicular to the axis 206 (shown in FIG. 14) of lead sheave 202 and the drum of winch 16. According to an exemplary embodiment, support structure 204 is rotatably mounted at substantially the centerline of vehicle 100.

Figure 12:
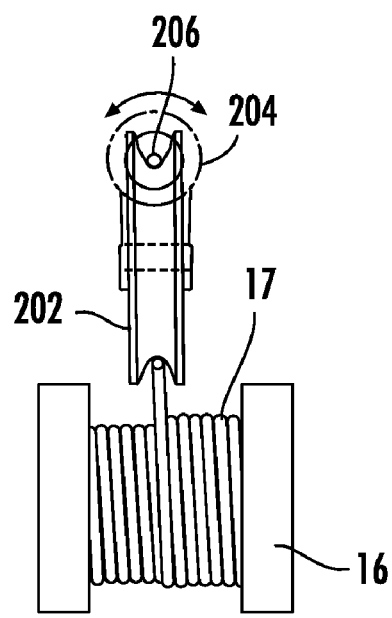
FIG. 12 is a top view of the sheave of FIG. 11 and a winch of the fleet angle management system showing the sheave in a first position.
Figure 13:
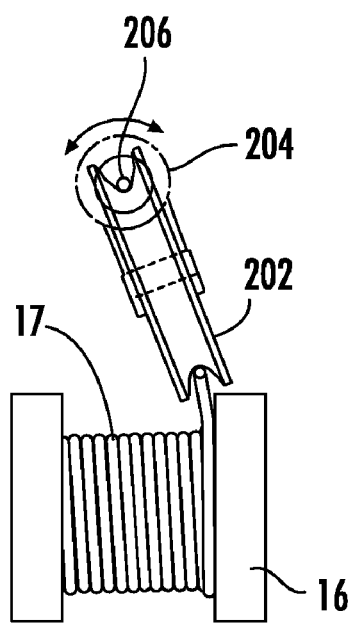
FIG. 13 is another top view of the sheave of FIG. 11 and a winch of the fleet angle management system showing the sheave in a second position.

An output side 208 of lead sheave 202 is aligned axially with the rotational axis of support structure 204. The force imposed by cable 17 on an input side 210 (i.e., drum side, etc.) of lead sheave 202 will cause support structure 204 to rotate about its axis 206 as cable 17 winds on and off the drum. Such a configuration allows input side 210 of lead sheave 202 to follow cable 17 in a sweeping arc as cable 17 winds on and off the drum. The movement of support structure 204 about axis 206 is shown in FIGS. 12 and 13. As input side 210 of lead sheave 202 follows cable 17 in a sweeping arc, output side 208 of lead sheave 202 remains centered about the rotational axis 206 of support structure 204 to keep cable 17 axially aligned as it extends to second sheave 148 and/or third sheave 150 (shown in FIG. 14).

Referring back to FIG. 11, winding system 200 is shown according to an exemplary embodiment. Support structure 204 of winding system 200 is shown as having a substantially cylindrical portion 212 configured to couple winding system 200 to base 12 and an extension member 214 configured to couple lead sheave 202 to winding system 200. According to an exemplary embodiment, cylindrical portion 212 is a tubular member having a substantially circular cross-section. Supported at a distal end of cylindrical portion 212 is one or more friction-reducing devices, shown as bearings 216, that configured to reduce friction between cylindrical portion 212 and base 12 as support structure 204 rotates about axis 206.

Referring back to FIG. 10, the positioning of winding system 200 relative to base 12 is shown according to an exemplary embodiment. In such an embodiment, support structure 204 of winding system 200 is mounted to third support member 34. Support structure 204 is mounted so that bearings 216 are provided below lead sheave 202. As such, cable 17 comes off the drum of winch 16 to input side 210 of lead sheave 202, which is positioned below winch 16. Cable 17 wraps around lead sheave 17 and exits output side 208.

Cable 17 then extends upwards while remaining axially aligned with axis 206 of support structure 204 until reaching second sheave 148 and/or third sheave 150. Cable 17 then wraps around one of second sheave 148 and third sheave 150 (i.e., depending on which side of vehicle 100 boom 14 is positioned) and passes through the inside of boom 14 until reaching first sheave 146.

Figure 15:
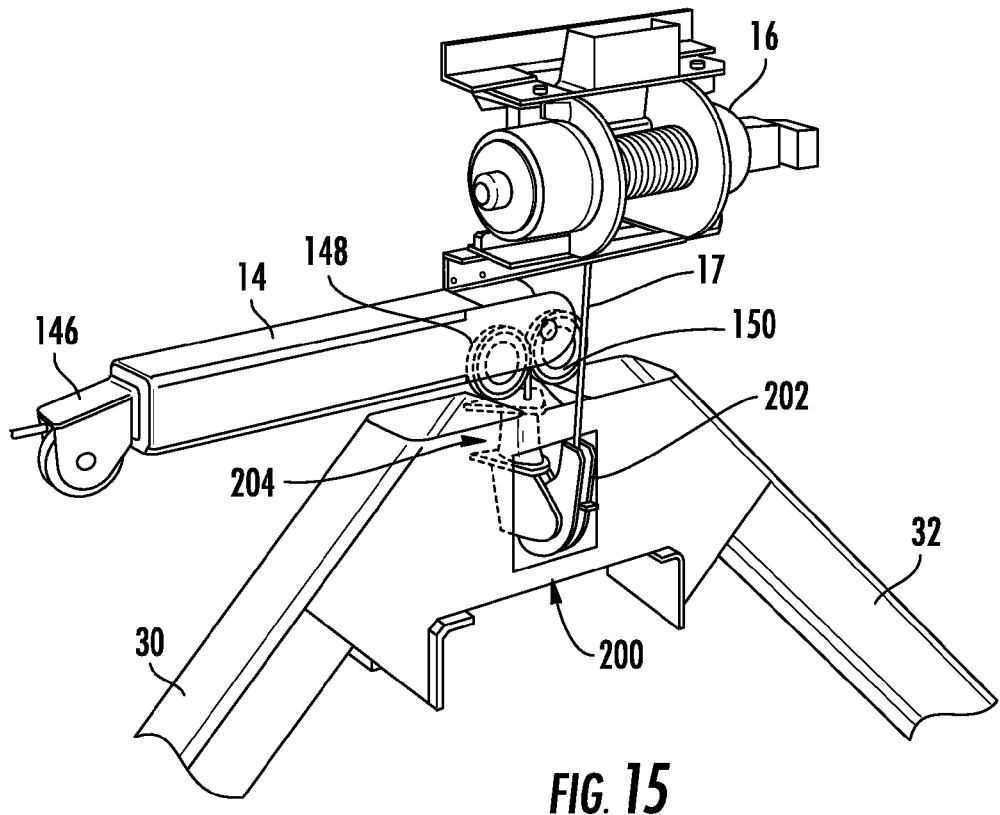
FIG. 15 is an isometric view of a side recovery system having a fleet angle management system according to another exemplary embodiment.

Referring to FIG. 15, the positioning of winding system 200 relative to base 12 is shown according to another exemplary embodiment. In such an embodiment, support structure 204 of winding system 200 is mounted to base 12 in a position that is upside down in comparison to the embodiment shown in FIG. 10. Specifically, support structure 204 is mounted so that bearings 216 are provided above lead sheave 202. As such, cable 17 comes off the drum of winch 16 to input side 210 of lead sheave 202, which is positioned below winch 16. Cable 17 wraps around lead sheave 17 and exits output side 208. Cable 17 then extends upwards through cylindrical portion 212 of support structure 204 while remaining axially aligned with axis 206 of support structure 204 until reaching second sheave 148 and/or third sheave 150. Cable 17 then wraps around one of second sheave 148 and third sheave 150 (i.e., depending on which side of vehicle 100 boom 14 is positioned) and passes through the inside of boom 14 until reaching first sheave 146. By positioning winding system 200 in this manner (i.e., with cylindrical portion 212 and bearings 216 positioned above lead sheave 202) the overall height requirements of winding system 200 may be further reduced.

The operation of side recovery system 10 will now be described with reference to all of the FIGURES generally. When second end 142 of boom 14 is positioned at a first side of vehicle 100 (e.g., the left side, etc.), actuator 174 will be in a retracted position and boom 14 will be resting against left leg 168 of bottom wall 146. The weight of boom 14 alone may be used to secure boom 14 in this position and/or actuator 174 may be used to secure boom 14 in this position. According to various alternative embodiments, a locking device (e.g., a locking pin, etc.) may be used to secure boom 14 in this position.

When an operator desires to change the positioning of second end 142 of boom 14 between the first side of vehicle 100 to a second side of vehicle 100 (e.g., the right side, etc.), the operator will manipulate a control for actuating actuator 174. In this case, actuator 174 will extend to cause boom 14 to rotate about axis until boom 14 engages right leg 170 of bottom wall 146. As boom 14 is being rotated, cable 17 moves from being engaged with the output side of second sheave 148 to being engaged with an output side of third sheave 150. All the while, cable 17 remains coupled to first sheave 146. As boom 14 moves to the second side of vehicle 100, first sheave 146 will rotate about its axis that is substantially parallel to boom 14 so that its output side is directed downward and/or outward.

The construction and arrangement of the elements of the side recovery system and the vehicle as shown in the illustrated and other exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited herein. For example, elements shown as integrally formed may be constructed of multiple parts or elements, the position of elements may be reversed or otherwise varied, and the nature or number of discrete elements or positions may be altered or varied. It should be noted that the elements and/or assemblies of the side recovery system may be constructed from any of a wide variety of materials that provide sufficient strength or durability in any of a wide variety of colors, combinations and suitable materials. Other substitutions, modifications, changes and omissions may be made in the design, operating conditions and arrangement of the preferred and other exemplary embodiments without departing from the scope of the present inventions.

The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the present inventions as expressed herein.

What is claimed is:

1. A side recovery system for a recovery vehicle having a longitudinal axis extending in a fore and aft direction of the vehicle, the system comprising:
    a base configured to be supported on the vehicle;
    a boom supported by the base and having a first end and a second end, the boom being rotatable relative to the base about a first axis configured to be substantially parallel to the longitudinal axis of the vehicle between a first position and a second position, the second end of the boom being positioned at a first side of the vehicle in the first position and at an opposite second side of the vehicle in the second position;
    a first sheave supported at the second end of the boom and configured to receive a load bearing cable, the cable configured to remain received by the first sheave as the boom rotates between the first position and the second position;
    a winch supported at the base, the winch having a drum configured to receive the cable; and
    a cable guidance system for directing the cable from the winch to the first sheave, the cable guidance system comprising:
        a second sheave coupled to the base and associated with directing the cable when the boom is in the first position;
        a third sheave coupled to the base and associated with directing the cable when the boom is in the second position; and
        a winding system having a lead sheave and a support member for supporting the lead sheave, the lead sheave being configured to direct the cable from the winch to at least one of the second sheave and the third sheave, the support member being rotatable about an axis.

2. The system of claim 1 wherein the cable is configured to remain axially aligned with the axis of the support member as the cable is directed to at least one of the second sheave and the third sheave.

3. The system of claim 1 wherein the boom is fixed such that the boom remains in a substantially vertical plane when rotating between the first position and the second position.

4. The system of claim 1 further comprising an actuator for moving the boom between the first position and the second position, the actuator having a first end coupled to the base and a second end coupled to the boom.

5. The system of claim 4 wherein the actuator is an extendable device that is extended to move the boom to the first position and retracted to move the boom to the second position.

6. The system of claim 1 wherein the base includes a pair of angled support members, a horizontal support member extending therebetween and an extension member supported at each lower end of the angled support members, the extension members each having a distal end supporting a stabilizer configured to be selectively adjusted between a first stabilizer position wherein the stabilizer functions as a support foot and a second stabilizer position wherein the stabilizer functions at least as a spade.

7. The system of claim 1 wherein the base includes a surface that controls the orientation of the boom in both the first position and the second position.

8. The system of claim 7 wherein the surface is a substantially V-shaped surface.

9. The system of claim 8 wherein the surface supports the boom at an angle between approximately 10 degrees and approximately 30 degrees relative to a horizontal axis when in the first position and the second position.

10. A recovery vehicle comprising:
a chassis;
a side recovery system supported at the chassis and including a boom that is selectively positionable between a first side of the vehicle and an opposite second side of the vehicle; and
fleet angle management system configured to supply a cable to the side recovery system, the fleet angle management system comprising:
a winch having a drum configured to receive the cable and rotatable about a first axis;
an output sheave configured to receive the cable from the winch; and
a winding device for guiding the cable from the winch to the output sheave, the winding device including a lead sheave and a support member for supporting the lead sheave, the lead sheave being rotatable about a second axis that is substantially parallel to the first axis, the lead sheave having an input side configured to receive the cable from the winch and an output side configured to direct the cable the output sheave, the support member being rotatable about a third axis that is substantially perpendicular to the first axis and the second axis,
wherein a force imposed by the cable on the input side of the lead sheave causes the support member to rotate about the third axis as the cable winds on and off the drum thereby reducing the fleet angle of the cable,
wherein the input side of the lead sheave follows the cable in a sweeping arc as the cable winds on and off the drum.

11. The system of claim 10 wherein the output side of the lead sheave remains centered about the third axis as the input side of the lead sheave follows the cable.

12. The vehicle of claim 10 wherein the boom is fixed such that the boom remains in a substantially vertical plane when rotating between the first side of the vehicle and the opposite second side of the vehicle.

13. The vehicle of claim 10 further comprising an actuator for moving the boom between the first side of the vehicle and the opposite second side of the vehicle, the actuator having a first end coupled to the chassis and a second end coupled to the boom.

14. The vehicle of claim 13 wherein the actuator is an extendable device that is extended to move the boom to the first side of the vehicle and retracted to move the boom to the opposite second side of the vehicle.

15. The vehicle of claim 10 further comprising a base coupled to the chassis and including a pair of angled support members, a horizontal support member extending therebetween and an extension member supported at each lower end of the angled support members, the extension members each having a distal end supporting a stabilizer configured to be selectively adjusted between a first stabilizer position wherein the stabilizer functions as a support foot and a second stabilizer position wherein the stabilizer functions at least as a spade.

16. The vehicle of claim 10 further comprising a support coupled to the chassis and the boom and including a surface that controls the orientation of the boom on both the first side of the vehicle and the opposite second side of the vehicle.

17. The vehicle of claim 16 wherein the surface is a substantially V-shaped surface.

18. The vehicle of claim 17 wherein the surface supports the boom at an angle between approximately 10 degrees and approximately 30 degrees relative to a horizontal axis.

19. A recovery vehicle comprising:
a chassis;
a side recovery system supported at the chassis and including a boom that is selectively positionable between a first side of the vehicle and an opposite second side of the vehicle; and
fleet angle management system configured to supply a cable to the side recovery system, the fleet angle management system comprising:
a winch having a drum configured to receive the cable and rotatable about a first axis;
an output sheave configured to receive the cable from the winch; and
a winding device for guiding the cable from the winch to the output sheave, the winding device including a lead sheave and a support member for supporting the lead sheave, the lead sheave being rotatable about a second axis that is substantially parallel to the first axis, the lead sheave having an input side configured to receive the cable from the winch and an output side configured to direct the cable the output sheave, the support member being rotatable about a third axis that is substantially perpendicular to the first axis and the second axis,
wherein a force imposed by the cable on the input side of the lead sheave causes the support member to rotate about the third axis as the cable winds on and off the drum thereby reducing the fleet angle of the cable,
wherein the input side of the lead sheave follows the cable in a sweeping arc as the cable winds on and off the drum,
wherein the support member includes a cylindrical portion having at least one friction reducing element supported thereon.

20. The system of claim 19 wherein the cable passes through the cylindrical portion before reaching the output sheave.

* * * * *